US005499273A

United States Patent [19]
Kull et al.

[11] Patent Number: 5,499,273
[45] Date of Patent: Mar. 12, 1996

[54] METHOD AND APPARATUS FOR SYMBOL CLOCK RECOVERY FROM SIGNAL HAVING WIDE FREQUENCY POSSIBILITIES

[75] Inventors: A. Corbett S. Kull, Palatine; Bradley B. Bakke, Elgin; John W. Arens, Grayslake, all of Ill.

[73] Assignee: Motorola, Inc., Schaumburg, Ill.

[21] Appl. No.: 438,721

[22] Filed: May 11, 1995

[51] Int. Cl.$^6$ .................................................. H04L 7/00
[52] U.S. Cl. ............................ 375/355; 375/326; 377/78
[58] Field of Search ................................. 375/355, 354, 375/371, 326, 373; 377/66, 78; 328/150; 327/58, 62, 91, 94

[56] References Cited

U.S. PATENT DOCUMENTS

| | | | |
|---|---|---|---|
| 4,599,732 | 7/1986 | LeFever | 375/355 |
| 4,941,155 | 7/1990 | Chuang et al. | 375/84 |
| 4,984,249 | 1/1991 | Long et al. | 375/373 |
| 5,103,464 | 4/1992 | Capkun et al. | 375/355 |
| 5,134,637 | 7/1992 | Beyer et al. | 375/373 |
| 5,247,544 | 9/1993 | LaRosa et al. | 375/371 |
| 5,259,005 | 11/1993 | LaRosa et al. | 375/355 |
| 5,280,501 | 1/1994 | Owen | 375/373 |
| 5,425,057 | 6/1995 | Paff | 375/326 |

OTHER PUBLICATIONS

Chuang, Justin C. et al., *IEEE Transactions on Communications*, "Burst Coherent Demodulation with Combined Symbol Timing, Frequency Estimation, and Diversity Selection", vol. 39, No. 7, Jul. 1991, pp. 1157–1164.

Sabel, L. P. et al., *IEEE Global Telecommunications Conference, Conference Record, GLOBECOM 1992*, "A Recursive Algorithm for the Estimation of Symbol Timing in PSK Burst Modems", Dec. 6, 1992, pp. 360–364.

*Primary Examiner*—Stephen Chin
*Assistant Examiner*—Tesfaldet Bocure
*Attorney, Agent, or Firm*—Daniel W. Juffernbruch

[57] ABSTRACT

The present invention provides an apparatus for symbol clock recovery from a received signal having wide range of frequency errors or offsets. Magnitudes of received inphase and quadrature sampled signals are determined (210). These magnitudes are summed and distributed (227) into accumulator registers (231, 232, 233, 235, 237, 239) for accumulating sums of the first and second signals for each sample time and substantially over a length of an expected burst. A maximum-minimum determination circuit (240) chooses the sample time having a largest or smallest sum to provide a recovered clock signal (270). The carrier could then be recovered (260), and a downsampler (250) downsamples the received inphase and quadrature signals based on the recovered clock signal.

16 Claims, 3 Drawing Sheets

5,499,273

METHOD AND APPARATUS FOR SYMBOL CLOCK RECOVERY FROM SIGNAL HAVING WIDE FREQUENCY POSSIBILITIES

BACKGROUND OF THE INVENTION

1. Technical Field.

The present invention relates to a radio receiver and, more particularly, relates to a radio receiver which performs clock recovery by detecting power.

2. Description of the Related Art

In a time division multiple access (TDMA) system, multiple users occupy several channels separated by time. Each user transmits and receives at specified times. Due to this time division, a method of symbol clock recovery also known as symbol synchronization is needed to correctly demodulate the receive signal. The closer the estimate to the true symbol timing, the less of a performance degradation will be seen. In previous time symbol synchronization systems, a significant time frequency offset can not be tolerated. At the time the symbol clock is recovered, a significant frequency offset is often still present on a received signal. Further, in such systems, the phase is not known, which makes the task of obtaining symbol synchronization more difficult.

A typical solution to this problem is to use a sampled waveform correlator or a type of phase-locked loop to extract the symbol timing. The sampled waveform correlator requires additional information such as a preamble and requires a significant amount of processing power. The phase-locked loop method is effective for a continuous transmission method, but in a time division multiple access (TDMA) environment, does not perform nearly as well as the sampled waveform correlator. Both techniques degrade when a frequency offset due to, for example, Doppler shifts, is introduced.

A technique for coherent demodulation of a received time division multiple access (TDMA) radio signal has been proposed by Chuang and Sollenberger in U.S. Pat. No. 4,941,155. Chuang and Sollenberger reconstruct the inphase and quadrature signals from the differential phase of an incoming signal. A vector sum of the reconstructed inphase and quadrature signals is taken, exploiting the fact that the phases of the incoming signal add constructively only at the optimal sample. At other than the optimal sample, the samples add destructively. The demodulator of Chuang and Sollenberger will tolerate a frequency offset less than the symbol rate divided by the number of samples per symbol. A technique capable of tolerating higher frequency offset such as due to Doppler shift is needed. Furthermore, a simple technique consuming less processing time and circuitry would also be desirable.

Furthermore, another technique by Sabel and Cowley has disclosed a coherent demodulator with a frequency and phase estimation performed prior to a timing estimate. Such frequency and phase estimates ensure that the signal input to a squaring or magnitude operation has no frequency offset and near perfect phase synchronization. Sabel and Cowley do not provide for a systems such as quadrature phase shift keyed systems (QPSK) having complex modulation. A simpler technique requiring processing of less data is desired. Further, a system capable of tolerating high frequency offsets or errors is needed. These frequency offsets or errors could be due to large Doppler offsets or frequency oscillator errors.

DETAILED DESCRIPTION OF THE PREFERRED EMBODIMENTS

The present invention provides an apparatus for symbol clock recovery from a received signal having wide range of frequency errors or offsets. Magnitudes of received inphase and quadrature sampled signals are determined. These magnitudes are summed and distributed into accumulator registers for accumulating sums of the first and second signals for each sample time and substantially over a length of an expected burst. A maximum-minimum determination circuit chooses the sample time having a largest or smallest sum to provide a recovered clock signal. The carrier is recovered, and a downsampler down samples the received inphase and quadrature signals based on the recovered clock signal.

The present invention operates in a wider range of frequency or Doppler error. The present invention tolerates any frequency offset or error up to the Nyquist rate minus half the symbol rate.

A simpler technique is provided saving processing time and hardware by using magnitudes of the inphase and quadrature received signals and a single bank of accumulator registers. Further, by recovering the clock before recovering the carrier, processing time and memory are conserved - extending battery life and freeing up processing power for other functions such as improved user interface features. Additionally, in a high frequency offset environment, recovering carrier before recovering the clock also requires even more processing time.

An additional benefit of the technique of the present invention is its ability to handle a variety of modulations. The present invention is capable of handling any digitally modulated non-constant envelope signal. For example, phase shift keyed (PSK), n-ary phase shift keying (n-PSK), quadrature phase shifted keyed (QPSK), phase amplitude modulation (PAM), n-ary quadrature amplitude modulation (n-QAM), gaussian mean shift keying (GMSK) and mean shift keying (MSK).

Figure 1:
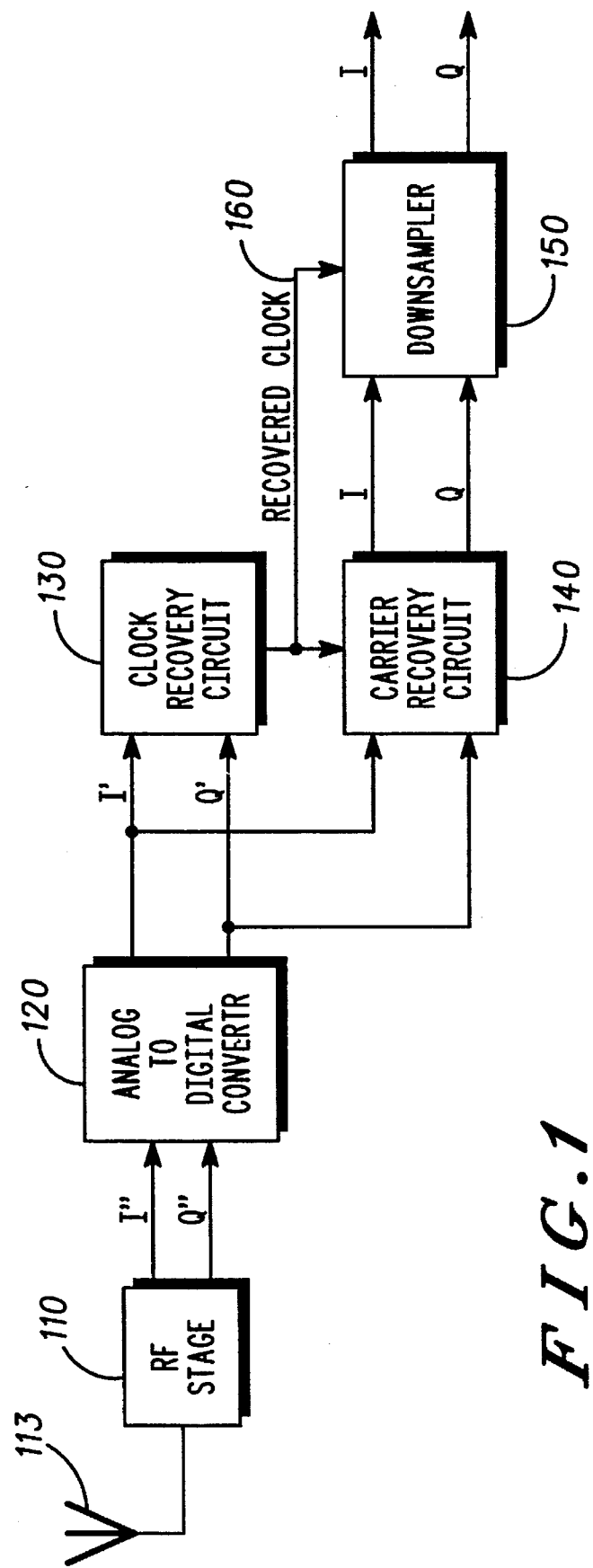
FIG. 1 illustrates a block diagram of a radio receiver according to the present invention.

FIG. 1 illustrates a schematic block diagram of a radio receiver according to the present invention. Antenna 113 receives a radiofrequency signal and a radiofrequency (RF) stage 110 converts the radiofrequency signal to an inphase signal (I") and a quadrature signal (Q"). An analog to digital converter 120 samples the inphase signal and the quadrature signal at a sampling rate. A clock recovery circuit 130 receives sampled inphase (I') and sampled quadrature (Q') signals from the analog to digital converter 120 and recovers a clock therefrom to provide a recovered clock 160. The clock recovery circuit 130 is capable of handling any digitally modulated non-constant envelope signal prior to carrier recovery. The clock recovery circuit 130 provides the recovered clock 160 for received signals having frequency offsets up to the Nyquist rate minus half the symbol rate. Thus, a wider range of frequency or Doppler error can be tolerated by the present invention using a simpler technique saving processing time and hardware.

Subsequent to the clock recovery by the clock recovery circuitry, the carrier can be recovered from the sampled inphase and sampled quadrature signals by a carrier recover circuit 140. When carrier is recovered in a system, the frequency and phase is recovered. Subsequent to the carrier recovery, a downsampler 150 down samples the result based on the recovered clock 160. The downsampler 150 can alternatively be placed before the carrier recovery circuit 140. In either event, the present invention allows clock recovery before carrier recovery and thus saves processing time, memory and hardware, thus extending battery life and freeing up processing power for other functions. Furthermore, in a high frequency offset environment, such as a high Doppler environment, recovering the carrier after clock recovery saves even more processing time.

Figure 2:
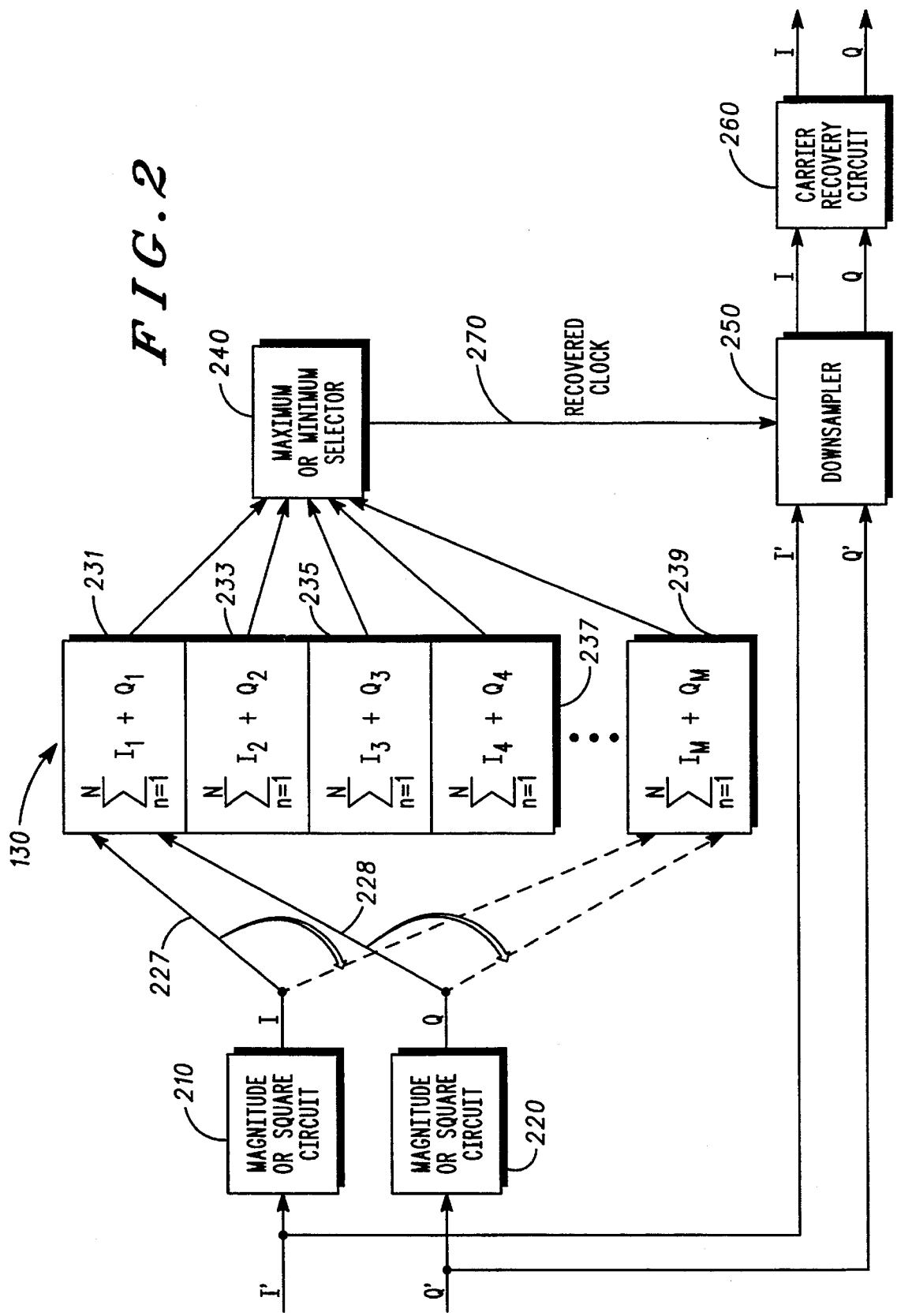
FIG. 2 illustrates a block diagram of an embodiment of a clock recovery stage of a radio receiver according to the present invention.

FIG. 2 illustrates the clock recovery circuit, carrier recovery circuit and downsampler according to one embodiment of the present invention. Sampled inphase and sampled quadrature signals (I') and (Q') are received by a magnitude or square circuit 210 and a magnitude or square circuit 220 respectively. Each of the magnitude or square circuits 210 and 220 remove the sign of the sampled inphase and sampled quadrature signals using a number of alternative techniques, preferably, each of the magnitude or square circuits 210 and 220 square the sampled inphase and sampled quadrature signals (I') and (Q'). Alternatively, the magnitude or square circuits 210 and 220 could cube or otherwise raise the input to an exponential of an even power. Any even power will remove the sign from the input. A higher power will amplify larger signals with respect to smaller signals and the power must be chosen with this amplification factor in mind. Alternatively, the magnitude or square circuits 210 and 220 could perform an absolute value function by rectification such as, for example, a full wave rectification function. Mathematically, such magnitude would be performed by an absolute value function.

Distributors 227 and 228 distribute each of the in-phase (I) and quadrature (Q) signals from the magnitude or square circuits 210 and 220 to a plurality of accumulator registers 231, 233, 235, 237 and 239. Each of these accumulator registers sums the inphase (I) and quadrature (Q) signals.

A number M of accumulator registers 231, 233, 235, 237 and 239 should be equal to the number of samples taken by the analog-to-digital converter 120 per expected symbol. The symbol length depends on the previously known characteristics of a time division multiple access (TDMA) burst to be received by the radiofrequency (RF) stage 110. Therefore, the distributors 227 and 228 must distribute the inphase (I) and quadrature (Q) signals among a number M of registers 231, 233, 235, 237 and 239.

Each register 231, 233, 235, 237 and 239 accumulates by summing a number N of samples. The number N of samples is preferably equal to the number of symbols per expected burst. For systems where the timing from one burst to the next is deterministic, the number N can be larger than the number of symbols per expected burst and values can be accumulated in the accumulator registers 231, 233, 235, 237, and 239 for more than one burst. However, for other systems, the number N must be less than or equal to the number of symbols per burst. In systems with varying propagation delay due to varying distances between transmitters and receivers, the number N must be less than or equal to the number of symbols per burst and values can not be accumulated for more than one burst. The registers 231, 233, 235, 237 and 239 thus sum values over an entire expected burst. Summing longer than the number N would cause more than one burst to be summed and errors could occur when bursts arrive at different times depending on the system.

A maximum or minimum selector 240 selects the summed output of the registers 231, 233, 235, 237 and 239 having either a maximum or a minimum value after the number N summations. Although a maximum detection by the maximum or minimum selector 240 is preferred, a minimum selection will also yield knowledge of the maximum, because usually, the minimum leads or lags the maximum by known amount dependent on the type of receiver implemented. For example, in a receiver implemented with symmetric symbol filtering, the distance between the minimum and the maximum is a known amount of one-half a symbol time. The maximum for the total of each summation N identifies a symbol clock. The recovered clock 270 is thus provided by the maximum or minimum selector 240.

A downsampler 250 and carrier recovery circuit 260 are also illustrated subsequent to the carrier recovery circuit 130 of the present invention. The recovered clock 270 is fed to the downsampler 250 for down sampling the sampled inphase (I') and sampled quadrature (Q') signals. Thereafter, carrier recovery is performed by a carrier recovery circuit 260.

Figure 3:
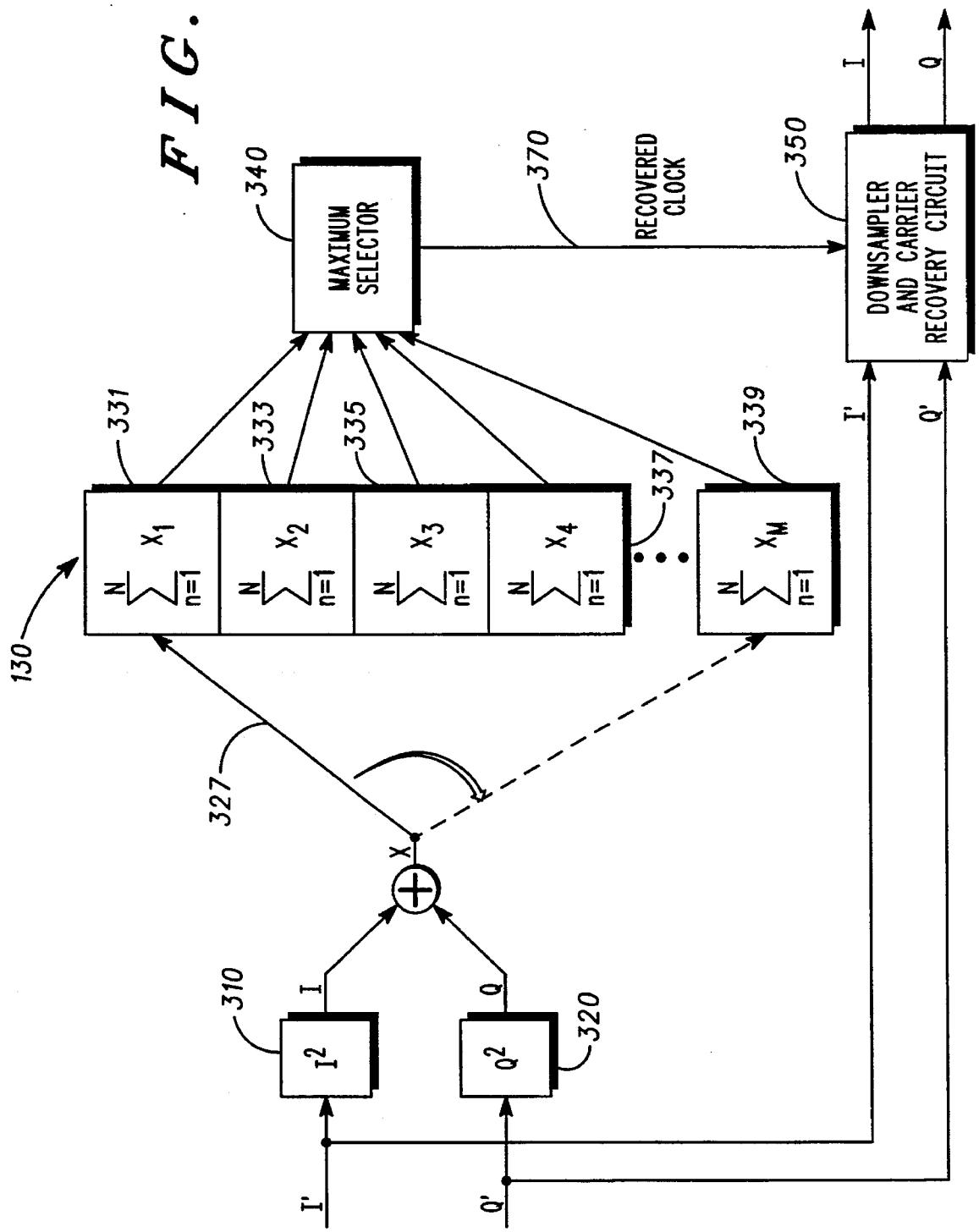
FIG. 3 illustrates block diagram of another embodiment of a clock recovery stage of a radio receiver according to the present invention.

FIG. 3 illustrates an alternative embodiment of the carrier recovery circuit and subsequent down sampling and carrier recovery according to the present invention. Sampled inphase (I') and quadrature (Q') signals are preferably squared in magnitude or square blocks 310 and 320. The resultant inphase (I) and quadrature (Q) signals are subsequently summed in an adder 323 before distribution by a distributor 327. One distributor can be used instead of two distributors by adding the inphase (I) and quadrature (Q) signals before distributing, and the extra addition performed in each accumulator register in the embodiment of FIG. 2. Thus, one distributor 327 distributes the summed result X to the accumulator registers 331, 333, 335, 337 and 339. In each of the number M of accumulator registers 331, 333, 335, 337 and 339, the resultant X is summed a number N times before selection of a maximum by a maximum selector 340. The maximum 340 preferably selects the maximum rather than the minimum and delivers a recovered clock 370. A downsampler and carrier recovery circuit 350 downsamples and recovers carrier of the sampled inphase (I') and quadrature (Q') signals. The down sampling and carrier recovery of the down sampling and carrier recovery circuit 350 can be performed in either order.

The signal processing techniques of the present invention disclosed herein with reference to the accompanying drawings are preferably implemented on a digital signal processor (DSP) or other microprocessor. Nevertheless, such techniques could instead be implemented wholly or partially as discrete components.

Although the invention has been described and illustrated in the above description and drawings, it is understood that this description is by example only, and that numerous changes and modifications can be made by those skilled in the art without departing from the true spirit and scope of the invention. Although the present invention exhibits Doppler shift tolerance, the present invention provides additional advantages as mentioned herein and is thus applicable to all radio communications systems regardless of the need for Doppler shift tolerance or frequency oscillator errors such as paging, cellular and satellite communication system receivers.

What is claimed is:

1. An apparatus for symbol clock recovery from a received inphase signal and a received quadrature signal having wide frequency possibilities, said apparatus comprising:

a first sampler for sampling the received inphase signal at sample times to provide a sampled inphase signal;

a second sampler for sampling the received quadrature signal at sample times to provide a sampled quadrature signal;

a first magnitude determination circuit operatively coupled to said first sampler for receiving the sampled inphase signal to provide a first signal indicative of a magnitude of the received inphase signal;

a second magnitude determination circuit operatively coupled to said second sampler for receiving the sampled quadrature signal to provide a second signal indicative of a magnitude of the received quadrature signal;

a distributor operatively coupled to said first magnitude determination circuit and said second magnitude determination circuit for distributing the first and second signal;

a plurality of accumulator registers operatively coupled to said distributor for accumulating sums of the first and second signals for each of the sample times and substantially over a length of an expected burst;

a maximum-minimum determination circuit operatively coupled to said plurality of accumulator registers for determining the accumulator register having one of a largest sum and a smallest sum to provide a recovered clock signal; and a downsampler operatively coupled to said maximum-minimum determination circuit, said first sampler and said second sampler for downsampling the sampled inphase signal and sampled quadrature signal based on the recovered clock signal.

2. An apparatus according to claim 1, further comprising an adder operatively coupled to said first magnitude determination circuit, said second magnitude determination circuit and said distributor for adding the first and second signals before distributing.

3. An apparatus according to claim 1, wherein said first magnitude determination circuit comprises a first exponential determining circuit for receiving the received inphase signal to provide a first signal indicative of an even power of the received inphase signal; and a second magnitude determination circuit comprises a second exponential determining circuit for receiving the received quadrature signal to provide a second signal indicative of an even power of the received quadrature signal.

4. An apparatus according to claim 3, wherein said first exponential determining circuit provides the first signal indicative of a square of the received inphase signal; and wherein said second exponential determining circuit provides the second signal indicative of a square of the received quadrature signal.

5. An apparatus according to claim 1, wherein said first magnitude determination circuit comprises a first rectifier for receiving the received inphase signal to provide a first signal indicative of an absolute value of the received inphase signal; and a second magnitude determination circuit comprises a second rectifier circuit for receiving the received quadrature signal to provide a second signal indicative of an absolute value of the received quadrature signal.

6. An apparatus according to claim 1, wherein said plurality of accumulator registers consists of a number of registers equal to the number of sample times per symbol time of an expected burst.

7. An apparatus according to claim 1, wherein said downsampler comprises a carrier recovery stage operatively coupled to said maximum-minimum determination circuit, said first sampler and said second sampler for recovering carrier based on the recovered clock signal, sampled inphase signal and sampled quadrature signal.

8. An apparatus according to claim 1, wherein said apparatus comprises a radio receiver.

9. A method for symbol clock recovery from a received inphase signal and a received quadrature signal having wide frequency possibilities, said method comprising the steps of:

(a) sampling the received inphase signal at sampling times to provide a sampled inphase signal;

(b) sampling the received quadrature signal at the sampling rate to provide a sampled quadrature signal;

(c) determining a first signal indicative of a magnitude of the received inphase signal;

(d) determining a second signal indicative of a magnitude of the received quadrature signal;

(e) distributing the first and second signals among a plurality of accumulator registers;

(f) in the accumulator registers, accumulating sums of the first and second signals for each sample time and substantially over a length of an expected burst;

(g) determining the accumulator register having one of a largest sum and a smallest sum to provide a recovered clock signal; and (h) downsampling the sampled inphase signal and sampled quadrature signal based on the recovered clock signal.

10. A method according to claim 9, further comprising the step of (i) adding the first and second signals before distributing.

11. A method according to claim 9, wherein said step (c) comprises the substep of (c1) determining a first signal indicative of an even power of the received inphase signal; and wherein said step (d) comprises the substep of (d1) determining a second signal indicative of an even power of the received quadrature signal.

12. A method according to claim 11, wherein said step (c1) determines the first signal indicative of a square of the received inphase signal; and wherein said step (d1) determines the second signal indicative of a square of the received quadrature signal.

13. A method according to claim 9, wherein said step (c) comprises the substep of (c1) determining a first signal indicative of an absolute value of the received inphase signal; and wherein said step (d) comprises the substep of (d1) determining a second signal indicative of an absolute value of the received quadrature signal.

14. A method according to claim 9, wherein said distributing of said 9step (e) distributes to the plurality of accumulator registers consisting of a number of registers equal to the number of sample times per symbol.

15. A method according to claim 9, wherein said step (h) comprises the step of (h1) recovering carrier for recovering carrier based on the recovered clock signal, sampled inphase signal and sampled quadrature signal.

16. An apparatus for symbol clock recovery from a received inphase signal and a received quadrature signal having wide frequency possibilities, said apparatus comprising:

- a first sampler for sampling the received inphase signal at sampling times to provide a sampled inphase signal;
- a second sampler for sampling the received quadrature signal at the sampling rate to provide a sampled quadrature signal;
- a first magnitude determination circuit operatively coupled to said first sampler for receiving the sampled inphase signal to provide a first signal indicative of a square of the received inphase signal;
- a second magnitude determination circuit operatively coupled to said second sampler for receiving the sampled quadrature signal to provide a second signal indicative of a square of the received quadrature signal;
- an adder operatively coupled to said first magnitude determination circuit, said second magnitude determination circuit and said distributor for adding the first and second signals to provide an added signal;
- a distributor operatively coupled to said adder for distributing the added signal;
- a plurality of accumulator registers operatively coupled to said distributor for accumulating sums of the first and second signals for each sample time and substantially over a length of an expected burst, wherein said plurality of accumulator registers consists of a number of registers equal to the number of sample times per symbol of an expected burst;
- a maximum-minimum determination circuit operatively coupled to said plurality of accumulator registers for determining the accumulator register having one of a largest sum and a smallest sum to provide a recovered clock signal; and
- a downsampler operatively coupled to said maximum-minimum determination circuit, said first sampler and said second sampler for downsampling the sampled inphase signal and sampled quadrature signal based on the recovered clock signal, wherein said downsampler comprises a carrier recovery stage operatively coupled to said maximum-minimum determination circuit, said first sampler and said second sampler for recovering carrier based on the recovered clock signal, sampled inphase signal and sampled quadrature signal.

* * * * *